(12) United States Patent
Fortmann

(10) Patent No.: US 7,102,103 B2
(45) Date of Patent: Sep. 5, 2006

(54) BANQUET CART INCLUDING HEAT RETENTION MATERIAL

(75) Inventor: Robert C. Fortmann, Grayslake, IL (US)

(73) Assignee: Carrier Commercial Refrigeration, Inc., Syracuse, NY (US)

( * ) Notice: Subject to any disclaimer, the term of this patent is extended or adjusted under 35 U.S.C. 154(b) by 0 days.

(21) Appl. No.: 10/366,775

(22) Filed: Feb. 14, 2003

(65) Prior Publication Data

US 2004/0159646 A1 Aug. 19, 2004

(51) Int. Cl.
*A47J 39/02* (2006.01)
*A47B 31/02* (2006.01)

(52) U.S. Cl. ...................... 219/386; 219/399

(58) Field of Classification Search ............... 219/386, 219/399; 165/104.11, 104.15, 104.17, 104.19, 165/104.21, 104.23
See application file for complete search history.

(56) References Cited

U.S. PATENT DOCUMENTS

| | | | | |
|---|---|---|---|---|
| 2,919,339 | A | * 12/1959 | Hilliker | 219/400 |
| 3,051,582 | A | * 8/1962 | Muckler et al. | 426/418 |
| 4,528,439 | A | * 7/1985 | Marney et al. | 219/386 |
| 4,781,243 | A | * 11/1988 | DeVogel et al. | 165/47 |
| 5,159,973 | A | * 11/1992 | Pennington et al. | 165/48.1 |
| 6,501,057 | B1 | 12/2002 | Jarvis | |

FOREIGN PATENT DOCUMENTS

| | | |
|---|---|---|
| DE | 31 25 842 | 1/1983 |
| DE | 32 20 410 | 12/1983 |
| DE | 38 43 287 | 6/1990 |
| EP | 0132475 A1 * | 2/1985 |
| EP | WO9805184 A1 * | 2/1998 |

OTHER PUBLICATIONS

Translation of EP 132475 a1, Laurent, publ. date: Feb. 13, 1985.*
International Search Report, Jul. 21, 2004.
Page 12 of "Food Warning Eqipment Company, Inc.'s", May 1, 2003 catalog.

* cited by examiner

Primary Examiner—Joseph Pelham
(74) Attorney, Agent, or Firm—Carlson, Gaskey & Olds

(57) ABSTRACT

A banquet cart includes a heater received in an opening in the bottom panel of the banquet cart. Plates of food are loaded into the interior compartment of the banquet cart in the kitchen. The heater includes a central heater unit and two heat retention material heating panels. The central heater unit heats the interior compartment of the banquet cart for twenty minutes. The central heater unit is turned off, and smaller heaters are turned on to heat the heat retention material heating panels for forty minutes. The smaller heaters are turned off and the banquet cart is rolled from the kitchen to a hallway proximate to the dining area for serving the plates of food to guests. The heated heat retention material heating panels can maintain the temperature of the air in the interior compartment of the banquet cart warm for approximately two hours and forty minutes, keeping the food in the banquet cart warm.

10 Claims, 2 Drawing Sheets

BANQUET CART INCLUDING HEAT RETENTION MATERIAL

BACKGROUND OF THE INVENTION

The present invention relates generally to a transportable banquet cart that stores plates of food and includes a heat retention material that keeps the food in the banquet cart warm prior to serving.

Banquet carts are employed in hotels, restaurants, and convention centers to keep plates of prepared food warm prior to serving at dinners, parties or receptions. The food is prepared in a kitchen area and served on plates. The plates are then covered with a lid or cover and stacked on shelves in the banquet cart. Banquet carts usually hold between 40 to 200 plates of food.

An electric convection heater in the banquet cart preheats the banquet cart before the plates of food are stacked on the shelves. The heater is plugged into an electrical outlet in the kitchen and heats the banquet cart to approximately 180–200° F. After the banquet cart is loaded with plates of food, the heater is unplugged, and the banquet cart is transported to a hallway outside of a dining area where the food is served to guests. The banquet cart includes wheels, allowing the banquet cart to be transported.

Electric power is usually not available in the hallway outside the dining area. During transport of the banquet cart to the hallway and while the banquet cart is stored in the hallway prior to serving of the plates of food to guests, the plates of food are usually warmed by canned heat, such as Sterno. The canned heat is ignited and usually positioned on the bottom shelf of the banquet cart or in a drawer. Between two to four cans of canned heat are usually employed to maintain the temperature of the food in the banquet cart at serving temperature up to two hours. The serving temperature varies depending on the type of food served.

There are several drawback to the prior art banquet cart. For one, the open flame of the canned heat is exposed, creating a fire hazard. If the banquet cart is accidentally knocked over, a fire can occur. The canned heat also takes up the entire bottom shelf, reducing the space available for plates of food. Lighting and loading of the canned heat into the banquet cart also requires additional labor. Additionally, the area proximate to the canned heat is warmer than the other areas of the banquet cart, which can cause the plates of food positioned around the canned heat to overcook and burn. Finally, canned heat is expensive, and large hotels can spend up to $100,000 per year on canned heat.

Hence, there is a need in the art for a banquet cart which does not use canned heat and overcomes the problems of the prior art.

SUMMARY OF THE INVENTION

A banquet cart includes a heat retention material that keeps plates of food in the banquet cart warm prior to serving. The banquet cart includes pair of pivotable doors which allow access to an interior compartment of the banquet cart. While the banquet cart is in a kitchen, the plates of food are stacked on shelves in the interior compartment. Preferably, the doors of the banquet cart are insulated to prevent heat from escaping from the interior compartment of the banquet cart. Gaskets attached proximate to the edges of the doors further prevent heat from escaping from the interior compartment.

The banquet cart further includes a heater that is received in an opening in the bottom panel of the banquet cart. The heater includes a central heater unit and two heat retention material heating panels on opposing sides of the central heating unit. The panels are each heated by a smaller heater. The panels are made of a heat retention material that heats quickly and cools slowly. In one example, the heat retention material is a lightweight plastic solid to solid phase change material. However, any heat retention material that stores heat and cools slowly can be employed.

The heater is plugged into an electrical outlet in the kitchen. The central heater unit is operated for twenty minutes to heat the interior compartment of the banquet cart to approximately 180–200° F. After twenty minutes, the central heater unit is turned off and the smaller heaters are turned on to heat the heat retention material heating panels for approximately forty minutes. After forty minutes of heating, the heat retention material heating panels are approximately 350° F.

After the heat retention material heating panels are heated, the smaller heaters are turned off and the heater is unplugged. The banquet cart is then transported proximate to the dining area for serving of the plates of food to guests. The heated heat retention material heating panels retain the air temperature in the interior compartment of the banquet cart warm for approximately two hours and forty minutes, keeping the plates of food warm prior to serving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompany the detailed description can be briefly described as follows.

DETAILED DESCRIPTION OF THE PREFERRED EMBODIMENT

Figure 1:
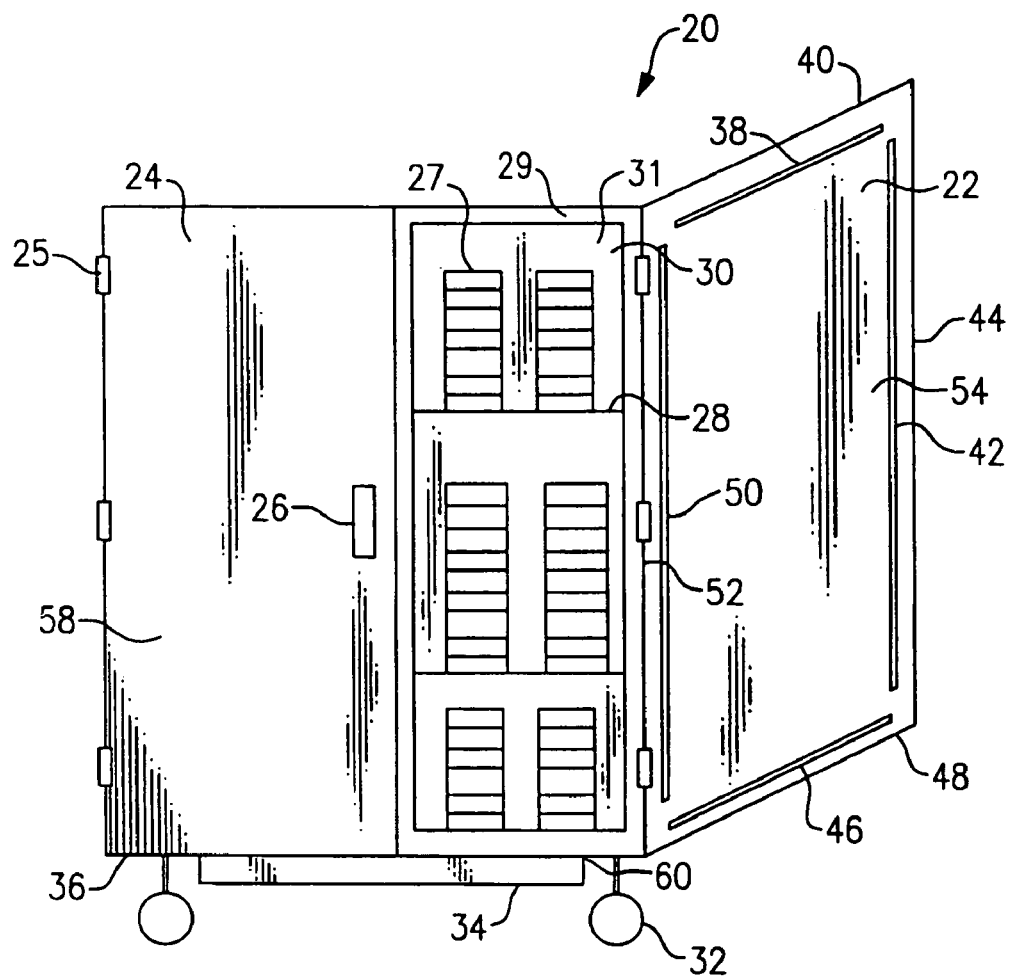
FIG. 1 schematically illustrates the banquet cart of the present invention.

FIG. 1 schematically illustrates the banquet cart 20 of the present invention. The banquet cart 20 includes two doors 22 and 24 pivotally attached to the banquet cart 20 by hinges 25. Each door 22 and 24 includes a handle 26 that allows for opening of the doors 22 and 24 for access to an interior compartment 30 of the banquet cart 20. In FIG. 1, the door 22 is illustrated as being open and the door 24 is illustrated as being closed. When the doors 22 and 24 of the banquet cart 20 are open, an opening 31 defined by an outer perimeter 29 allows access to the interior compartment 30. The doors 22 and 24 each have an interior panel 54 and an exterior panel 58. Although two doors 22 and 24 have been illustrated and described, it is to be understood that any number of doors can be employed. For example, the banquet cart 20 can only include one door.

The banquet cart 20 further includes a plurality of shelves 28 in the interior compartment 30. Plates of food 27 are stacked on the shelves 28 while the banquet cart 20 is in a kitchen. The plates of food 27 are covered by a cover or lid. The banquet cart 20 further includes four wheels 32 which allow the banquet cart 20 to be transported from the kitchen to a hallway proximate to a dining area where the plates of food 27 are to be served. A heater unit 34 is received in an opening 60 in the bottom panel 36 of the banquet cart 20.

Four gaskets 38, 42, 46 and 50 are positioned on the interior panel 54 of each of the doors 22 and 24. Although only door 22 is illustrated and described, it is to be understood that the door 24 includes the same features as door 22. The door 22 includes an upper edge 40, an outer edge 44, a lower edge 48 and an inner edge 52. An upper gasket 38 is positioned proximate to the upper edge 40 of the door 22, an outer gasket 42 is positioned proximate to the outer edge 44 of the door 22, a lower gasket 46 is positioned proximate to the lower edge 48 of the door 22, and an inner gasket 50 is positioned proximate to the inner edge 52 of the door 22. When the doors 22 and 24 are closed, the gaskets 38, 42, 46 and 50 form a seal against the outer perimeter 29, preventing heat in the interior compartment 30 of the banquet cart 20 from escaping. Although four gaskets 38, 42, 46 and 40 have been illustrated and described, it is to be understood that fewer gaskets can be employed. For example, only three gaskets can be employed on the interior panel 54 of the door 22. For example, a gasket can be employed along the upper edge 40, the outer edge 44, and the inner edge 52 of the door 22.

Figure 2:
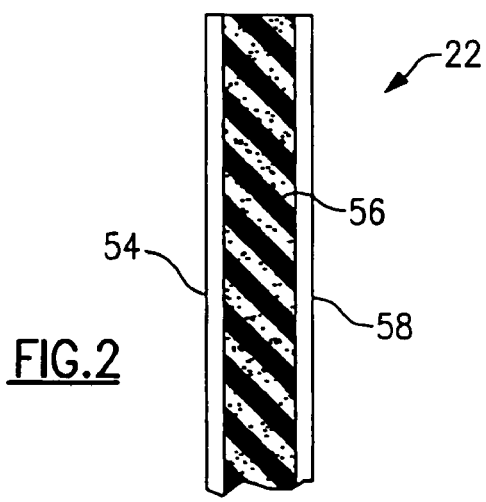
FIG. 2 schematically illustrates a cross sectional view of one of the doors of the banquet cart.

Preferably, the doors 22 and 24 are insulated to further prevent heat from escaping from the interior compartment 30 of the banquet cart 20. FIG. 2 illustrates a cross-section of the door 22. As shown, an insulating material 56 located between the interior panel 54 and the exterior panel 58 of the door 22 further prevents heat from escaping from the interior compartment 30 of the banquet cart 20 when the doors 22 and 24 are closed. The door 24 is constructed in a similar manner and also includes the insulating material 56 between the interior panel 54 and the exterior panel 58.

Figure 3:
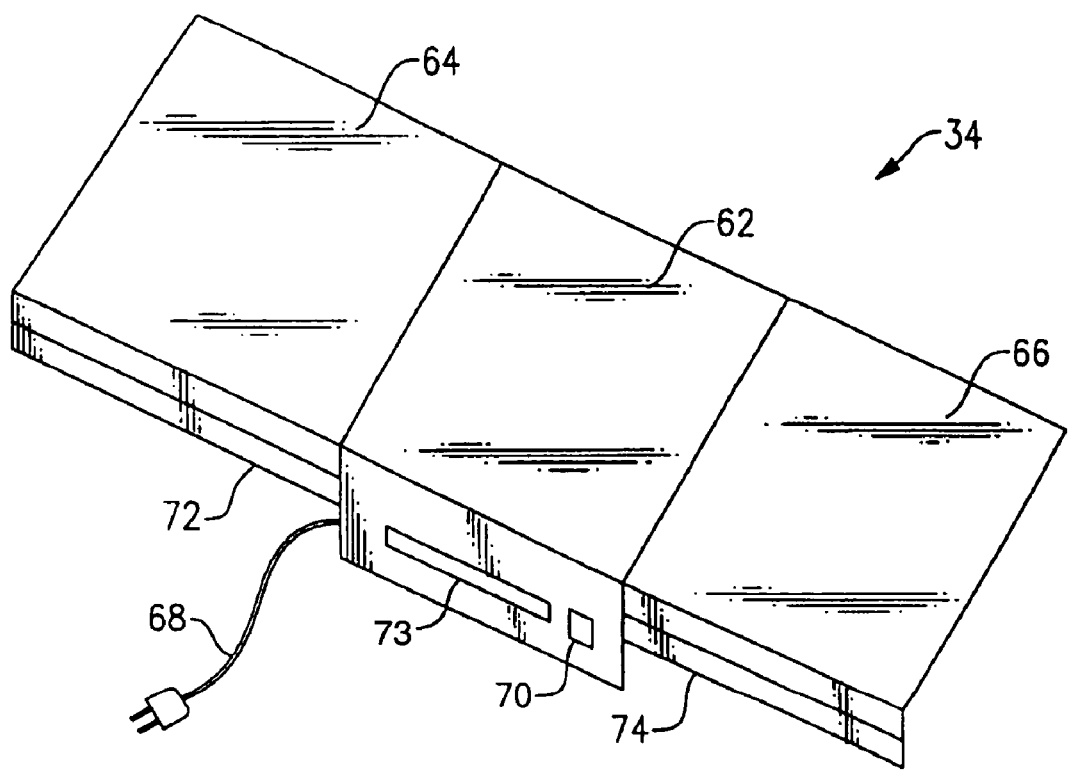
FIG. 3 schematically illustrates a perspective view of the heater of the banquet cart.

FIG. 3 schematically illustrates the heater unit 34 received in the opening 60 in the bottom panel 36 of the banquet cart 20. The heater unit 34 includes an electrical cord 68 that is plugged into an electrical outlet in the kitchen. The heater unit 34 includes a central heater unit 62 and two heat retention material heating panels 64 and 66. In one example, one panel of heat retention material is positioned on each side of the central heater unit 62. However, other orientations of the heat retention material heating panels 64 and 66 is possible. Although two heat retention material heating panels 64 and 66 are illustrated and described, it is to be understood than any number of panels can be employed, based on the size of the banquet cart 20. One skilled in the art would know how many panels to employ. For a larger banquet cart 20, three or more panels can be employed, and for a smaller banquet cart 20, one panel can be employed.

The heater unit 34 is received in the opening 60 in the bottom panel 36 of the banquet cart 20. When the banquet cart 20 is to be cleaned, the heater unit 34 can be easily removed for cleaning. This is advantageous as the heater unit 34 will not get wet when the interior compartment 30 of the banquet cart 20 is cleaned.

The heat retention material heating panels 64 and 66 are each heated by a smaller heater 72 and 74, respectively, and shown schematically. In one example, each heat retention material heating panel 64 and 66 is 12 inches wide by 19 inches long by 1⅛ of an inch in height. However, it is to be understood that the panels 64 and 66 can be of any shape and dimension based on the size of the banquet cart 20.

The heat retention material heating panels 64 and 66 can be made of any material that retains heat quickly and cools slowly. In the preferred embodiment, the heat retention material heating panels 64 and 66 are made of a lightweight plastic solid to solid phase change material. One example of this material is sold by CookTek and has a phase change at 270° F. This material retains its shape during heating and cooling. However, it is to be understood that any heat retention material that retains heat quickly and cools can be employed. For example, the heat retention material heating panels 64 and 66 can be aluminum or wax.

When the interior compartment 30 of the banquet cart 20 is to be heated, the electrical cord 68 of the heater unit 34 is plugged into an electrical outlet in the kitchen. The heater unit 34 is operated by a control 70. When the heater unit 34 is turned on, the control 70 turns on the central heater 62, which heats the interior compartment 30 of the banquet cart 20. In one example, the central heater 62 heats the interior compartment 30 of the banquet cart 20 for twenty minutes. However, one skilled in the art would know how long to heat the interior compartment 30. After twenty minutes of heating, the interior compartment 30 of the banquet cart 20 is approximately 180–200° F. However, it is to be understood that other ranges of temperatures are possible. The control 70 turns the central heater unit 62 off, and the control 70 turns the smaller heaters 72 and 74 on to heat the heat retention material heating panels 64 and 66. Preferably, the heat retention material heating panels 64 and 66 are heated for approximately forty minutes. After forty minutes of heating, the temperature of the heat retention material heating panels 64 and 66 is approximately 350° F. Once the banquet cart 20 is preheated, the plates of food 27 are loaded onto the shelves 28.

The electrical cord 68 of the banquet cart 20 is then unplugged from the outlet in the kitchen and wrapped around a cord holder 73. The heated banquet cart 20 is then transported to the hallway. As the heat retention material heating panels 64 and 66 are heated to approximately 350° F. by the small heaters 72 and 74, the heated heat retention material heating panels 64 and 66 can retain the temperature of the air in the interior compartment 30 of the banquet cart 20 above 140° F. for approximately two hours and forty minutes, keeping the plates of food 27 warm. This is possible as the temperature of the heat retention material heating panels 64 and 66 is approximately 270° F. two hours and forty minutes after heating by the small heaters 72 and 74.

When the plates of food 27 are to be served, the handle 26 of the desired door 22 and 24 is pulled to open the door 22 and 24 and allow access to the interior compartment 30 of the banquet cart 20. The plates of food 27 are removed and served to guests in the dining area. The heat retention material heating panels 64 and 66 are able to retain heat and cool slowly, and the interior compartment 30 of the banquet cart 20 is warmed without the use of an open flame. The plates of food 27 are maintained warm in the banquet cart 20 for approximately two hours and forty minutes after leaving the kitchen.

Additionally, although it has been described that the heat retention material heating panels 64 and 66 are used in connection with a central heater unit 62, it is to be understood that the panels of heat retention material 64 and 66 can be used alone without the central heater unit 62. In this example, the banquet cart 20 is not preheated by a central heater. The small heaters 72 and 74 heat the heat retention material heating panels 64 and 66 to approximately 350° F. When the banquet cart 20 is transported to the hallway proximate to the dining area, the heat retention material heating panels 64 and 66 warm the interior compartment 30 of the banquet cart 20 and the plates of food 27 prior to serving without the use of canned heat. The heat retention material heating panels 64 and 66 can also be located in other areas of the banquet cart 20. For example, the heat retention material can be located in the walls of the banquet cart.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A heater unit comprising:
   a central heater to heat an interior compartment; at least one heat retaining element made of a plastic solid to solid phase change material; and
   an element heater to heat said at least one heat retaining element, and said at least one heat retaining element warms said interior compartment,
   wherein said central heater is active to heat said interior compartment and said element heater is inactive during a first mode of heating,
   wherein said central heater is inactive and said element heater is active to heat said at least one heat retaining element during a second mode of heating which is after said first mode of heating, and
   wherein said central heater and said element heater are inactive and said at least one heat retaining element warms said interior compartment during a third mode of heating which is after said first mode of heating and said second mode of heating.

2. The healer unit as recited in claim 1 wherein said at least one heat retaining element comprises two heat retaining elements.

3. The heater unit as recited in claim 1 wherein said central heater heats said interior compartment to approximately 180 to 200° F.

4. The heater unit as recited in claim 3 wherein said central heater is operated for twenty minutes.

5. The heater unit as recited in claim 1 wherein said element heater heats said at least one heat retaining element to approximately 350° F.

6. The heater unit as recited in claim 5 wherein said element heater is operated for forty minutes.

7. The heater unit as recited in claim 5 wherein said at least one heat retaining element retains a temperature in said interior compartment of said banquet cart at a temperature of at least 140° F. for at least two hours and forty minutes.

8. The heater unit as recited in claim 1 wherein said at least one heat retaining element is substantially planar.

9. The heater unit as recited in claim 1 wherein said element heater is heated by an electrical source.

10. The heater unit as recited in claim 1 wherein said at least one heat retaining element and said element heater of said heater unit are combined into a single unit.

* * * * *

UNITED STATES PATENT AND TRADEMARK OFFICE
CERTIFICATE OF CORRECTION

PATENT NO.         : 7,102,103 B2
APPLICATION NO. : 10/366775
DATED              : September 5, 2006
INVENTOR(S)        : Robert C. Fortmann It is certified that error appears in the above-identified patent and that said Letters Patent is hereby corrected as shown below:

Claim 2, Column 6, line 6: "healer" should be --heater--

Claim 7, column 6, line 22: please delete "." after --F--

Signed and Sealed this

Twenty-eighth Day of November, 2006

JON W. DUDAS
*Director of the United States Patent and Trademark Office*